(12) United States Patent
Szumacher et al.

(10) Patent No.: US 10,451,830 B2
(45) Date of Patent: Oct. 22, 2019

(54) FIBER OPTIC CABLE ASSEMBLY AND FABRICATION METHOD USING SEQUENTIALLY ARRANGED BOOTS FOR MULTI-FIBER FERRULE

(71) Applicant: Corning Optical Communications LLC, Hickory, NC (US)

(72) Inventors: Maciej Lukasz Szumacher, Lodz (PL); Hieu Vinh Tran, Charlotte, NC (US); Antwan Joco'ques Works, Lewisville, TX (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/848,616

(22) Filed: Dec. 20, 2017

(65) Prior Publication Data

US 2018/0188463 A1 Jul. 5, 2018

Related U.S. Application Data

(60) Provisional application No. 62/439,944, filed on Dec. 29, 2016.

(51) Int. Cl.
G02B 6/44 (2006.01)
G02B 6/38 (2006.01)
G02B 6/36 (2006.01)

(52) U.S. Cl.
CPC ........... *G02B 6/448* (2013.01); *G02B 6/3644* (2013.01); *G02B 6/3885* (2013.01);
(Continued)

(58) Field of Classification Search
CPC .................................. G02B 6/44; G02B 6/38
(Continued)

(56) References Cited

U.S. PATENT DOCUMENTS

| 5,321,784 | A | * | 6/1994 | Cubukciyan | ......... | G02B 6/3821 385/78 |
| 5,727,101 | A | * | 3/1998 | Giebel | ................. | G02B 6/3834 385/59 |

(Continued)

OTHER PUBLICATIONS

USCONEC Applications Engineering Notes; "24 Fiber MTP® Connector Installation Onto 2×12 Fiber 3.0 MM Jacketed Round Cable With Loose Fibers"; April 15, 2010, 24 Pages.
(Continued)

*Primary Examiner* — Kaveh C Kianni
(74) *Attorney, Agent, or Firm* — Adam R. Weeks

(57) ABSTRACT

At least one group of loose optical fibers is restrained at multiple locations during fabrication of a fiber optic cable assembly using rear and front ferrule boots, thereby avoiding a need for traditional ribbonizing techniques. The group(s) of loose optical fibers are inserted through one or more apertures defined in each of the rear ferrule boot and the front ferrule boot, and inserted through at least one group of bores defined in a ferrule. A rear portion of the ferrule receives at least a portion of the front ferrule boot. A manufacturing fixture including a removable jig may retain a rear ferrule boot and a medial section of the group(s) of loose optical fibers, while the front ferrule boot and a terminal section of the group(s) of loose optical fibers are positioned outside the fixture for further processing. A fiber optic cable assembly including front and rear ferrule boots, as well as methods of fabrication, are further provided.

12 Claims, 14 Drawing Sheets

(52) U.S. Cl.
CPC ......... *G02B 6/3887* (2013.01); *G02B 6/4471* (2013.01); *G02B 6/4495* (2013.01); *G02B 6/3898* (2013.01)

(58) Field of Classification Search
USPC .......................................................... 385/72
See application file for complete search history.

(56) References Cited

U.S. PATENT DOCUMENTS

| | | |
|---|---|---|
| 8,485,735 B2 | 7/2013 | Childers et al. |
| 9,151,923 B2 | 10/2015 | Nielson et al. |
| D810,027 S | 2/2018 | De Jong et al. |
| 9,891,392 B2* | 2/2018 | Kanno .................. G02B 6/3821 |
| 2003/0021548 A1* | 1/2003 | Luther .................. G02B 6/3885 385/86 |
| 2003/0063868 A1* | 4/2003 | Fentress ............... G02B 6/3825 385/78 |
| 2006/0115218 A1 | 6/2006 | Howard et al. |
| 2006/0280408 A1 | 12/2006 | Anderson et al. |
| 2007/0104445 A1* | 5/2007 | Larson ................. G02B 6/3801 385/134 |
| 2008/0253729 A1* | 10/2008 | Gronvall .............. G02B 6/4472 385/137 |
| 2008/0310798 A1* | 12/2008 | Cody ................... G02B 6/3887 385/80 |
| 2011/0044588 A1* | 2/2011 | Larson ................. G02B 6/3846 385/81 |
| 2012/0128305 A1* | 5/2012 | Cooke .................. G02B 6/3887 385/78 |
| 2012/0328248 A1* | 12/2012 | Larson ................. G02B 6/3887 385/81 |
| 2013/0108220 A1 | 5/2013 | Gonzalez Garcia et al. |
| 2013/0136401 A1 | 5/2013 | Cooke et al. |
| 2013/0195406 A1 | 8/2013 | Cooke et al. |
| 2014/0037250 A1* | 2/2014 | Treadwell ............ G02B 6/3887 385/78 |
| 2014/0064665 A1* | 3/2014 | Ott ....................... G02B 6/3821 385/60 |
| 2015/0177465 A1 | 6/2015 | Anderson et al. |
| 2015/0338581 A1* | 11/2015 | Hikosaka ............. G02B 6/3887 385/83 |
| 2015/0355415 A1* | 12/2015 | Cline ................... G02B 6/3672 385/83 |
| 2016/0004016 A1* | 1/2016 | Zimmel ............... G02B 6/3885 385/59 |
| 2016/0274310 A1* | 9/2016 | Li ........................ G02B 6/3821 |
| 2017/0153397 A1 | 6/2017 | Dejong et al. |

OTHER PUBLICATIONS

International Search Report and Written Opinion PCT/US2017/067533 dated Mar. 21, 2018.

* cited by examiner

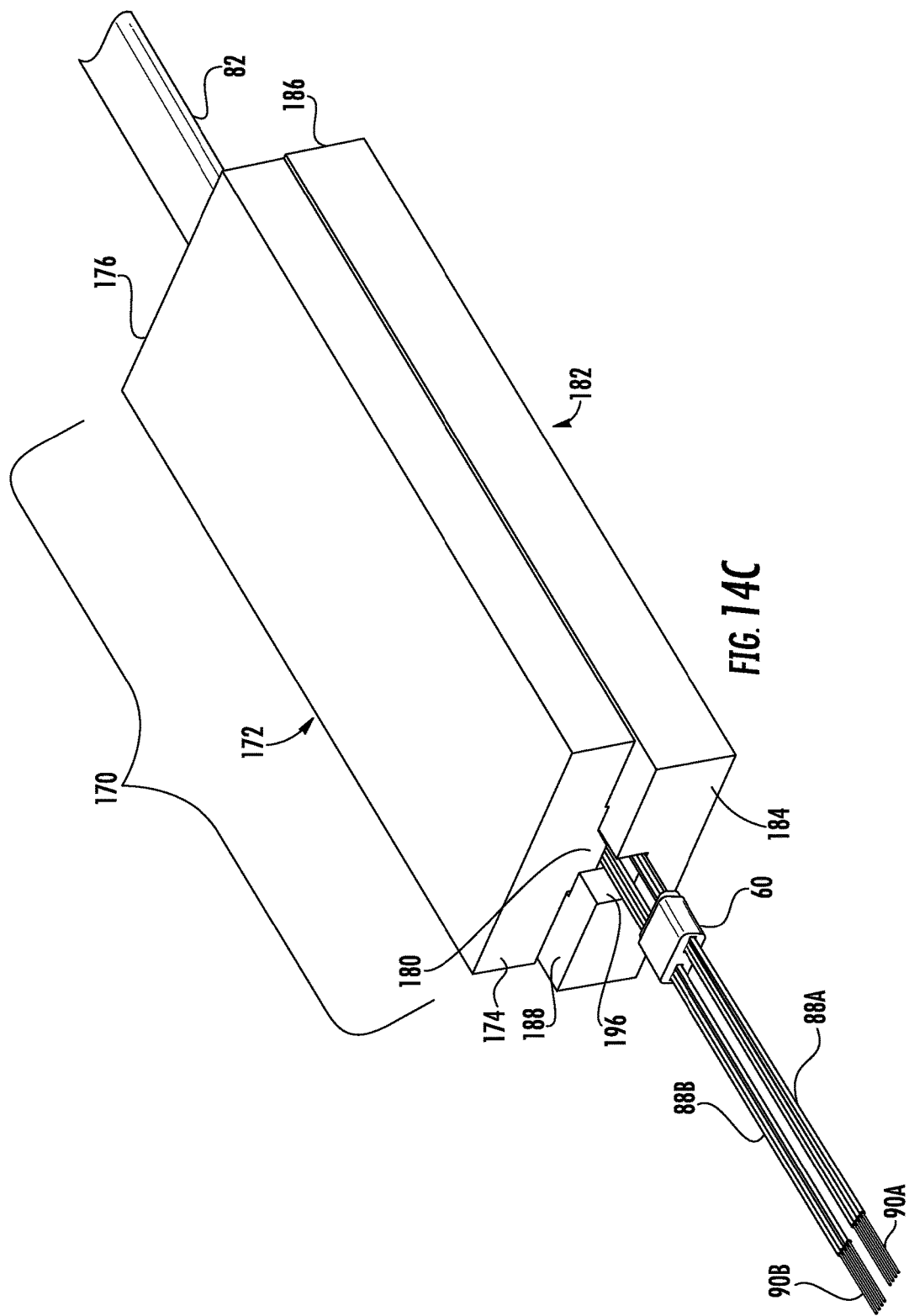

FIBER OPTIC CABLE ASSEMBLY AND FABRICATION METHOD USING SEQUENTIALLY ARRANGED BOOTS FOR MULTI-FIBER FERRULE

CROSS-REFERENCE TO RELATED APPLICATION

This application claims the benefit of priority of U.S. Provisional Application Ser. No. 62/439,944, filed on Dec. 29, 2016, the content which is relied upon and incorporated herein by reference in its entirety.

BACKGROUND

This disclosure relates generally to optical fibers, and more particularly to fiber optic cable assemblies incorporating multi-fiber ferrules, and methods for fabricating fiber optic cable assemblies.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors ("connectors") are often provided on the ends of fiber optic cables. The process of terminating individual optical fibers from a fiber optic cable is referred to as "connectorization." Connectorization can be performed in a factory (resulting in a "pre-connectorized" or "pre-terminated" fiber optic cable) or in the field (e.g., using a "field-installable" connector).

Many different types of fiber optic connectors exist. In environments that require high density interconnects and/or high bandwidth, such as data centers, multi-fiber optical connectors are the most widely used. Multi-fiber optical connectors are suitable for use with multi-fiber cables and frequently utilize multi-fiber ferrules. One example of a multi-fiber optical connector is the multi-fiber push on (MPO) connector, which incorporates a mechanical transfer (MT) ferrule and is standardized according to TIA-604-5 and IEC 61754-7. These connectors can achieve a high density of optical fibers, which reduces the amount of hardware, space, and effort required to establish a large number of interconnects.

Despite the widespread use of MPO connectors in data center environments, there are still challenges and issues to address. For example, although MPO connectors may contain any even number of fibers between 4 and 24 within the same physical package, 12-fiber connectors are the most commonly used. For some applications, such as parallel optics for 40 Gigabits per second (Gps) Ethernet, only 8 active fibers are needed. Conversion modules may be used to convert the unused fibers from two or more MPO connectors into usable optical links (e.g., converting 4 unused fibers from each of two MPO connectors into 8 useable optical links), but the conversion adds costs to a network. Alternatively, cable assemblies can be built with only 8 fibers terminated by an MPO connector, but the MPO connector still resembles a 12-fiber connector, and it can be difficult to see with the naked eye whether 8 fibers or 12 fibers are present. This uncertainty in fiber count may result in network issues if a connector having 12 active fibers is inadvertently mated to a connector having only 8 active fibers.

Also, securing groups of fibers during assembly of a MPO connector can be challenging for fabrication steps such as fiber stripping, cleaving, and affixing fibers within a MT style ferrule. Traditional ribbonizing techniques have utilized adhesives to secure fibers together after a portion of a jacket of a multi-fiber cable is stripped. Such techniques, however, are cumbersome, and can be particularly challenging when it is desired to segregate multiple groups of fibers emanating from the same multi-fiber cable for insertion into a MT style ferrule. For example, it is very difficult to hold separate ribbons and insert them into microholes of MT style ferrules. But as difficult as it may be to manipulate two ribbons at the same time, it is even more difficult to manipulate four, eight, twelve or more loose (e.g., non-ribbonized) fibers at the same time.

Thus, the art continues to seek fiber optic cable assemblies and fabrication methods that address limitations associated with conventional assemblies and methods, including cable assemblies and methods that facilitate handling of optical fiber segments without requiring use of ribbonizing techniques.

SUMMARY

Aspects of the present disclosure provide a fiber optic cable assembly and fabrication method using multiple sequentially arranged boots for a multi-fiber ferrule. Such fiber optic cable assembly and fabrication methods facilitate handling of loose optical fiber segments emanating from a fiber optic cable by securing at least one group of loose optical fibers using rear and front ferrule boots. Specifically, one or more groups of loose optical fibers extend through at least one aperture defined in a rear ferrule boot and through at least one aperture defined in a front ferrule boot. Spacing apart the front and rear ferrule boots enables the loose optical fibers to be restrained at multiple locations, thereby reducing potential for twisting or misalignment of the optical fibers (e.g., during reception of the optical fibers by a ferrule) while avoiding a need for traditional ribbonizing techniques. Additionally, as an example, provision of front and rear ferrule boots each having a reduced length relative to a conventional single continuous ferrule boot shortens an insertion distance for each optical fiber, thereby reducing a potential for binding during each optical fiber insertion step.

In exemplary aspects, a plurality of loose optical fiber segments emanating from a fiber optic cable are assembled into at least one group (optionally, multiple groups) of loose optical fibers. The at least one group (optionally, multiple groups) of loose optical fibers is sequentially inserted through at least one aperture (optionally, multiple apertures) defined in a rear ferrule boot and at least one aperture (optionally, multiple apertures) defined in a front ferrule boot. Thereafter, the at least one group of loose optical fibers is inserted through at least one group (optionally, multiple groups) of bores defined in a ferrule. At least a portion of the front ferrule boot is received within a rear portion of the ferrule. Optionally, the rear ferrule boot and a medial section of the at least one group of loose optical fibers may be received in a manufacturing fixture, with the front ferrule boot and a terminal section of the at least one group of optical fibers positioned outside the manufacturing fixture during one or more ferrule securement and/or fiber processing (e.g., termination) steps. All of the preceding steps may be performed without ribbonization of the optical fiber segments emanating from the fiber optic cable.

In other exemplary aspects, a fiber optic cable assembly includes a fiber optic cable, a ferrule, at least one group (optionally, multiple groups) of optical fibers, a front ferrule boot, and a rear ferrule boot. The ferrule includes a front end face and defines at least one group (optionally, multiple groups) of bores extending through the front end face. The at least one group of optical fibers emanate from the fiber optic cable and extend through the at least one group of bores. Ends of the optical fibers are terminated proximate to the front end face of the ferrule, and the optical fibers are secured within the ferrule proximate to the at least one group of bores. A front ferrule boot defines at least one aperture, and the rear ferrule boot defines at least one aperture (optionally, multiple apertures), through which the at least one group of loose optical fibers extends. At least a forward portion of the front ferrule boot is received within a rear portion of the ferrule, and the front ferrule boot is positioned between a portion of the ferrule and the rear ferrule boot. The at least one group of loose optical fibers is non-ribbonized when extending through the at least one aperture defined in each of the front ferrule boot and the rear ferrule boot.

Embodiments of a fiber optic cable assembly, and methods for fabricating a fiber optic cable assembly as disclosed herein, are provided below. An exemplary fiber optic cable assembly includes a fiber optic cable having multiple optical fibers and a fiber optic connector, incorporating a ferrule and multiple ferrule boots as disclosed herein, installed on the fiber optic cable.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 14C is a perspective view of the manufacturing fixture of FIG. 14A following assembly with the fiber optic subassembly of FIG. 8 received therein.

DETAILED DESCRIPTION

Figure 1:
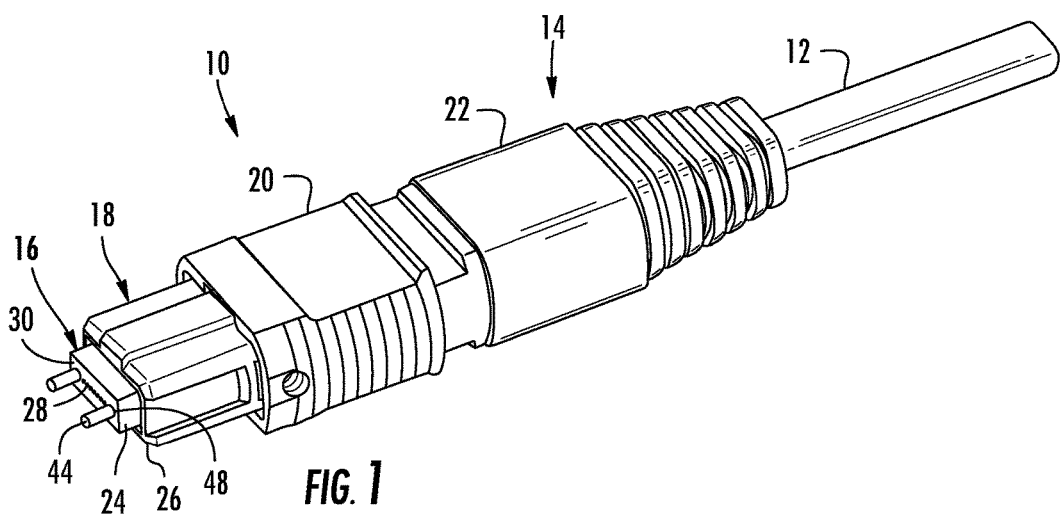
FIG. 1 is a perspective view of a fiber optic connector and an associated fiber optic cable forming a fiber optic cable assembly, with the fiber optic connector including a multi-fiber ferrule with a single ferrule boot to serve as a comparison structure for subsequently described embodiments.

Various embodiments will be further clarified by examples in the description below. In general, the description relates to a fiber optic cable assembly and related fabrication methods that facilitate handling of loose optical fiber segments emanating from a fiber optic cable by securing at least one group of loose optical fibers using rear and front ferrule boots. The at least one group of loose optical fibers extends through at least one aperture (optionally, multiple apertures) defined in a rear ferrule boot and through at least one aperture (optionally, multiple apertures) defined in a front ferrule boot, with the ferrule boots being configured for use with a multi-fiber ferrule of a fiber optic connector. One example of a fiber optic connector 10 (also referred to as "optical connector 10", or simply "connector 10") is shown in FIG. 1, with an exploded view of the connector being provided in FIG. 2. The connector 10 is shown in the form of an MTP® connector, which is particular type of MPO connector (MTP® is a trademark of US Conec Ltd.).

Figure 2:
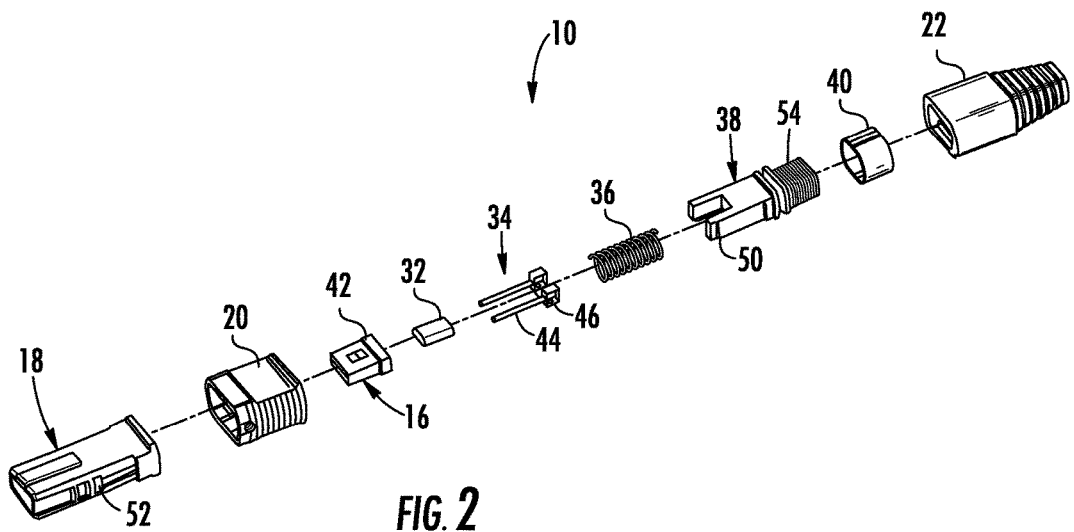
FIG. 2 is an exploded perspective view of the fiber optic cable assembly of FIG. 1.

Before discussing sequentially arranged ferrule boot embodiments for use with multi-fiber ferrules and associated fabrication methods, a brief overview of the connector 10 shown in FIGS. 1 and 2 will be provided to facilitate discussion, as the multi-fiber ferrules and other components shown in subsequent figures may be used in connection with the same type of connector as the connector 10. However, persons skilled in the field of optical connectivity will appreciate that the connector 10 is merely an example, and that the general principles disclosed with respect to the multi-fiber ferrules and other components shown in subsequent figures may also be applicable to other connector designs.

As shown in FIG. 1, the connector 10 may be installed on a fiber optic cable 12 ("cable") to form a fiber optic cable assembly 14. The connector 10 includes a ferrule 16, a housing 18 received over the ferrule 16, a slider 20 received over the housing 18, and a boot 22 received over the cable 12. The ferrule 16 is spring-biased within the housing 18 so that a front portion 24 of the ferrule 16 extends beyond a front end 26 of the housing 18. Optical fibers (not shown) carried by the cable 12 extend through bores 28 (also referred to as micro-holes) defined in the ferrule 16 before terminating at or near a front end face 30 of the ferrule 16. The optical fibers are restrained within the ferrule 16 using an adhesive material (e.g., epoxy) and can be presented for optical coupling with optical fibers of a mating component (e.g., another fiber optic connector; not shown) when the housing 18 is inserted into an adapter, receptacle, or the like.

As shown in FIG. 2, the connector 10 also includes a ferrule boot 32, guide pin assembly 34, spring 36, crimp body 38, and crimp ring 40. The ferrule boot 32, which is unitary in character, is received in a rear portion 42 of the ferrule 16 to help support the optical fibers extending to the ferrule bores 28 (shown in FIG. 1). In particular, optical fibers extend through an aperture (not shown) defined through the ferrule boot 32. The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 16, and the guide pins 44 extend through pin holes 48 (shown in FIG. 1) provided in the ferrule 16 so as to project beyond the front end face 30 of the ferrule 16.

Both the ferrule 16 and guide pin assembly 34 are biased to a forward position relative to the housing 18 by the spring 36. More specifically, the spring 36 is positioned between the pin keeper 46 and a portion of the crimp body 38. The crimp body 38 is inserted into the housing 18 when the connector 10 is assembled and includes latching arms 50 that engage recesses 52 in the housing 18. The spring 36 is compressed by this point and exerts a biasing force on the ferrule 16 via the pin keeper 46. The rear portion 42 of the ferrule 16 defines a flange that interacts with a shoulder or stop formed within the housing 18 to retain the rear portion 42 of the ferrule 16 within the housing 18. The rear portion 42 of the ferrule 16 also includes a recess (not shown) configured to receive at least a front portion of the ferrule boot 32.

In a manner not shown in the figures, aramid yarn or other strength members from the cable 12 are positioned over an end portion 54 of the crimp body 38 that projects rearwardly from the housing 18. The aramid yarn is secured to the end portion 54 by the crimp ring 40, which is slid over the end portion 54 and deformed after positioning the aramid yarn. The boot 22 covers this region, as shown in FIG. 1, and provides strain relief for optical fibers emanating from the fiber optic cable 12 by limiting the extent to which the connector 10 can bend relative to the fiber optic cable 12.

Now that a general overview of the connector 10 has been provided, alternative ferrule designs will be described. Although the ferrule 16 includes a surface embodying a flat front end face 30, in certain embodiments, one or more portions of the front end face 30 may protrude forwardly from such a surface to form one or more pedestals through which multiple bores (such as bores 28 shown in FIG. 1) extend. Similarly, although the front end face 30 of the ferrule 16 shown in FIG. 1 includes multiple bores 28 that are equally spaced to form a one-dimensional array, in certain embodiments, multiple groups of bores may extend through a front end face with one or more solid regions free of bores provided between such groups of bores. For example, a ferrule configured for parallel optics applications for 40 Gps transmission may include first and second groups of four bores that are spaced apart (e.g., by a distance equal to four bores) and that each receive a different group of four optical fibers, with a solid region free of bores provided between the groups of bores along a front end face of the ferrule. A ferrule having such a configuration would be particular suited for parallel optics applications for 40 Gps transmission (relative to a ferrule including twelve bores in which only the first four and the last bores include terminated optical fibers) in that there would be no unused optical fibers or empty bores.

As noted previously, the ferrule boot 32 shown in FIG. 2 is unitary in character, such that upon insertion of a group of optical fibers through an aperture defined through the ferrule boot 32, the group of optical fibers is restrained at a single location. Embodiments of the present disclosure include multiple (e.g., rear and front) ferrule boots that are capable of securing at least one group of optical fibers at multiple locations, which is beneficial during fabrication of a fiber optic cable assembly for reasons noted previously herein. Each ferrule boot may include one or multiple apertures each configured to retain multiple loose optical fibers. Although apertures of any suitable shape may be provided, in certain embodiments, each aperture includes a rectangular shape configured to receive a one dimensional array of optical fibers, with the rectangular shape including a height slightly exceeding the diameter of a single optical fiber, and including a width slightly exceeding a multiple (e.g., two, three, four, six, eight, etc.) of the diameter of a single optical fiber. When multiple apertures are provided, at least one boundary is provided therebetween to ensure that the apertures are discontinuous in character. First and second apertures of each ferrule boot may be laterally offset and/or vertically offset relative to one another. Preferably, one or more apertures defined in a rear ferrule boot are registered with one or more apertures defined in a front ferrule boot. Any suitable number of apertures may be provided in each ferrule boot, such as one, two, three, four, or more, with corresponding numbers of grouped optical fibers.

Figure 3:
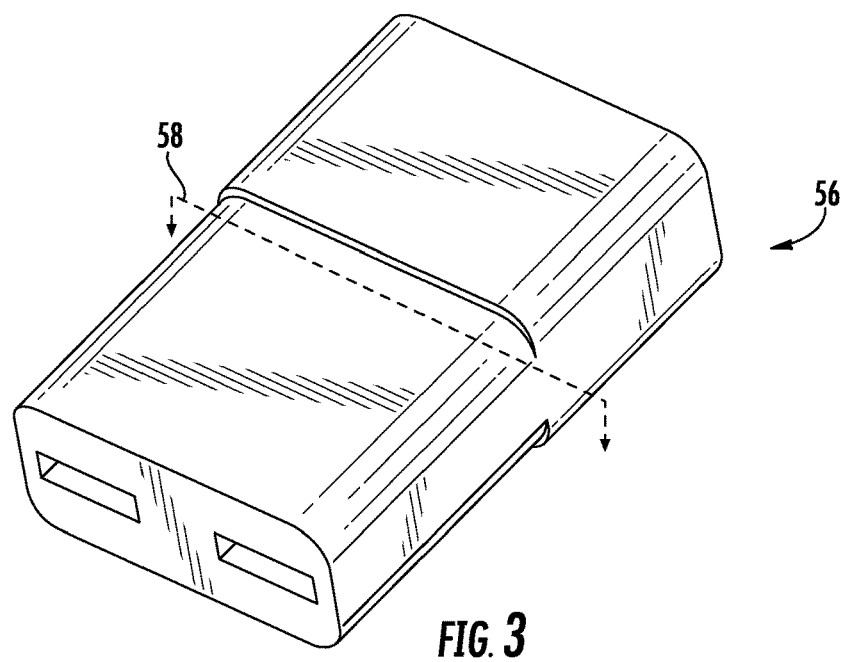
FIG. 3 is a perspective view of an exemplary dual aperture ferrule boot precursor structure suitable for fabricating multiple ferrule boots that may be used in combination in lieu of the single ferrule boot illustrated in FIG. 2.
Figure 4:
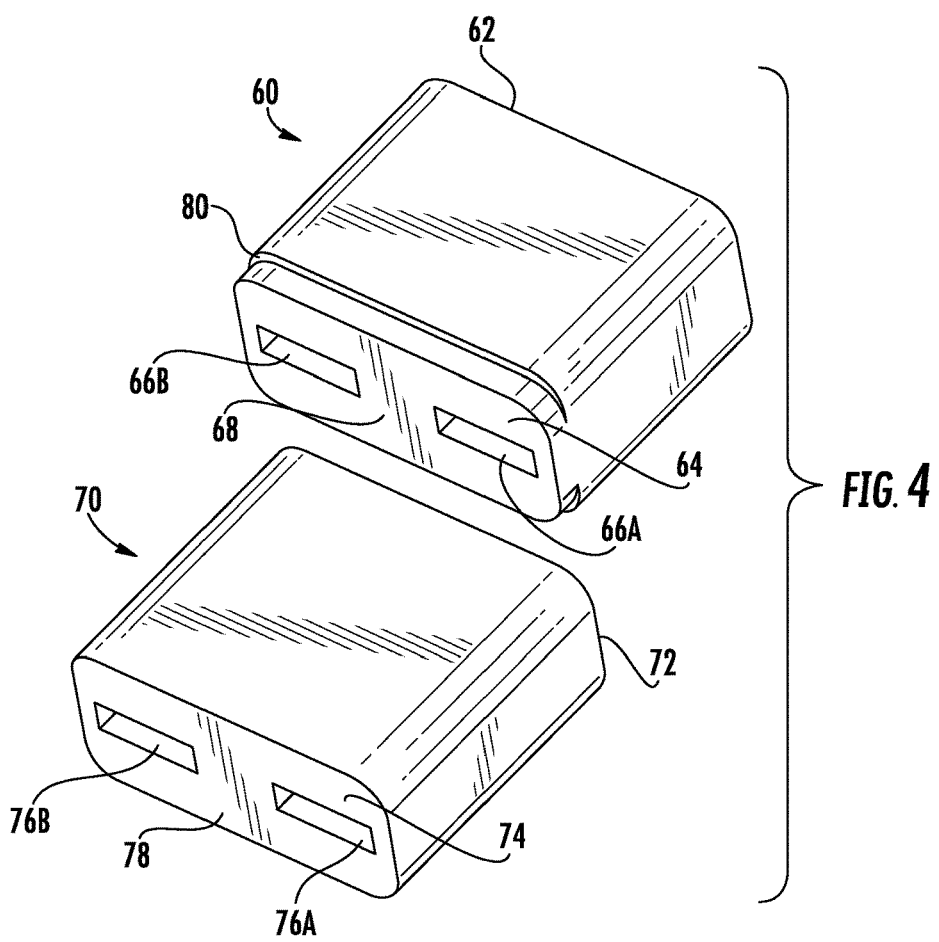
FIG. 4 is a perspective view of an exemplary front ferrule boot and a rear ferrule boot formed by dividing the dual aperture ferrule boot precursor structure of FIG. 3, with the front and rear ferrule boots in combination being suitable for use in lieu of the single ferrule boot illustrated in FIG. 2.

In certain embodiments, front and rear ferrule boots may be produced by dividing (e.g., slicing, cutting, etc.) a ferrule boot precursor structure, with such division from a single precursor structure being useful to ensure that apertures defined in the respective front and rear ferrule boots are registered with one another. FIG. 3 illustrates a dual aperture ferrule boot precursor structure 56 that may be divided (e.g., by cutting with a blade along an intermediate line 58 or other appropriate means) into a front ferrule boot 60 and a rear ferrule boot 70, as shown in FIG. 4. In certain embodiments, the front ferrule boot 60 and the rear ferrule boot 70 may comprise an elastomeric material or other polymeric material, and may be formed by molding or other appropriate fabrication methods. The front ferrule boot 60 includes a front end face 62, a rear end face 64, and two apertures 66A, 66B (also referred to hereinafter as a "first aperture 66A" and a "second aperture 66B") that extend through a body of the front ferrule boot 60 between the front end face 62 and the rear end face 64. Similarly, the rear ferrule boot 70 includes a front end face 72, a rear end face 74, and two apertures 76A, 76B (also referred to hereinafter as a "first aperture 76A" and a "second aperture 76B") that extend through a body of the rear ferrule boot 70 between the front end face 72 and the rear end face 74. As shown, the first aperture 66A and the second aperture 66B of the front ferrule boot 60 as well as the first aperture 76A and the second aperture 76B of the rear ferrule boot 70 are each rectangular in shape, including a width substantially exceeding a height thereof, and sized and shaped to each receive multiple optical fibers. The first and second apertures 66A, 66B of the front ferrule boot 60 are separated by a medial body portion 68 of the front ferrule boot 60, and the first and second apertures 76A, 76B of the rear ferrule boot 70 are separated by a medial body portion 78 of the rear ferrule boot 70. The front and rear ferrule boots 60, 70 are shown in FIG. 4 as having the same width, but with the front ferrule boot 60 including shoulders 80 extending upward and downward, such that the front ferrule boot 60 has a greater height proximate to the front end face 62 than its height proximate to the rear end face 64. Additionally, the front ferrule boot 60 has a greater height than the rear ferrule boot 70. In certain embodiments, the front ferrule boot 60 may differ in width and/or length relative to the rear ferrule boot 70.

As noted previously, provision of front and rear ferrule boots that are spaced apart from one another during manufacture of a fiber optic cable assembly enables loose optical fibers to be restrained at multiple locations, thereby reducing potential for twisting or misalignment of the optical fibers (e.g., during reception of the optical fibers by a ferrule) while avoiding a need for traditional ribbonizing techniques.

FIGS. 5-9 illustrate various exemplary steps that may be utilized for fabrication of at least a portion of a fiber optic cable assembly (or a subassembly thereof) including the above-described front and rear ferrule boots 60, 70 as well as a multi-fiber ferrule. The front and rear ferrule boots 60, 70 in combination may be used in lieu of the single ferrule boot 32 illustrated in FIG. 2 to form a fiber optic cable assembly similar to the assembly 10 shown in FIGS. 1 and 2. Steps for fabricating at least a portion of a fiber optic cable assembly including the front and rear ferrule boots 60, 70 are described in more detail below.

Figure 5:
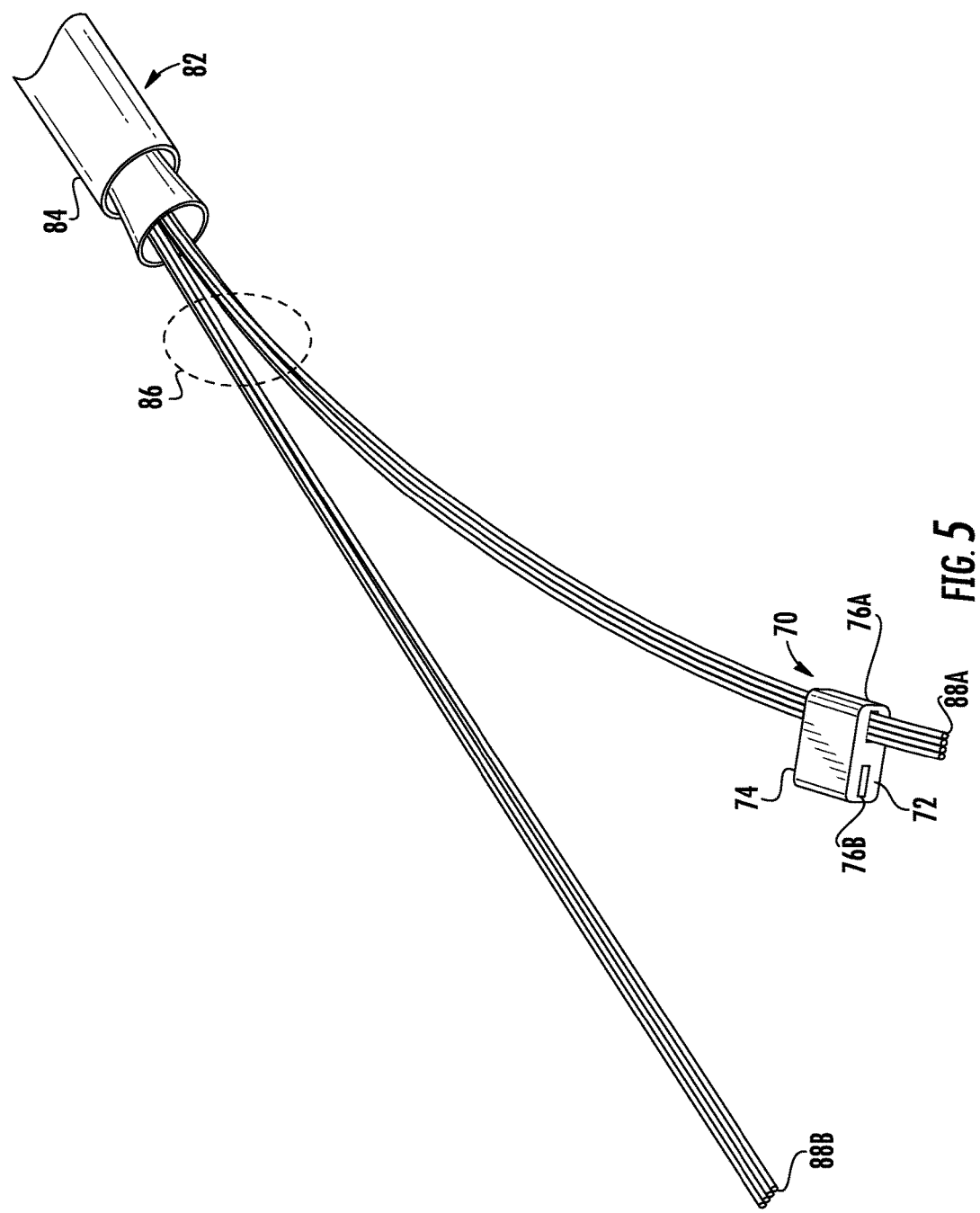
FIG. 5 is a perspective view of a fiber optic cable subassembly including multiple groups of loose optical fibers emanating from a multi-fiber cable following insertion of a first group of loose optical fibers through a first aperture of the rear ferrule boot of FIG. 4.
Figure 6:
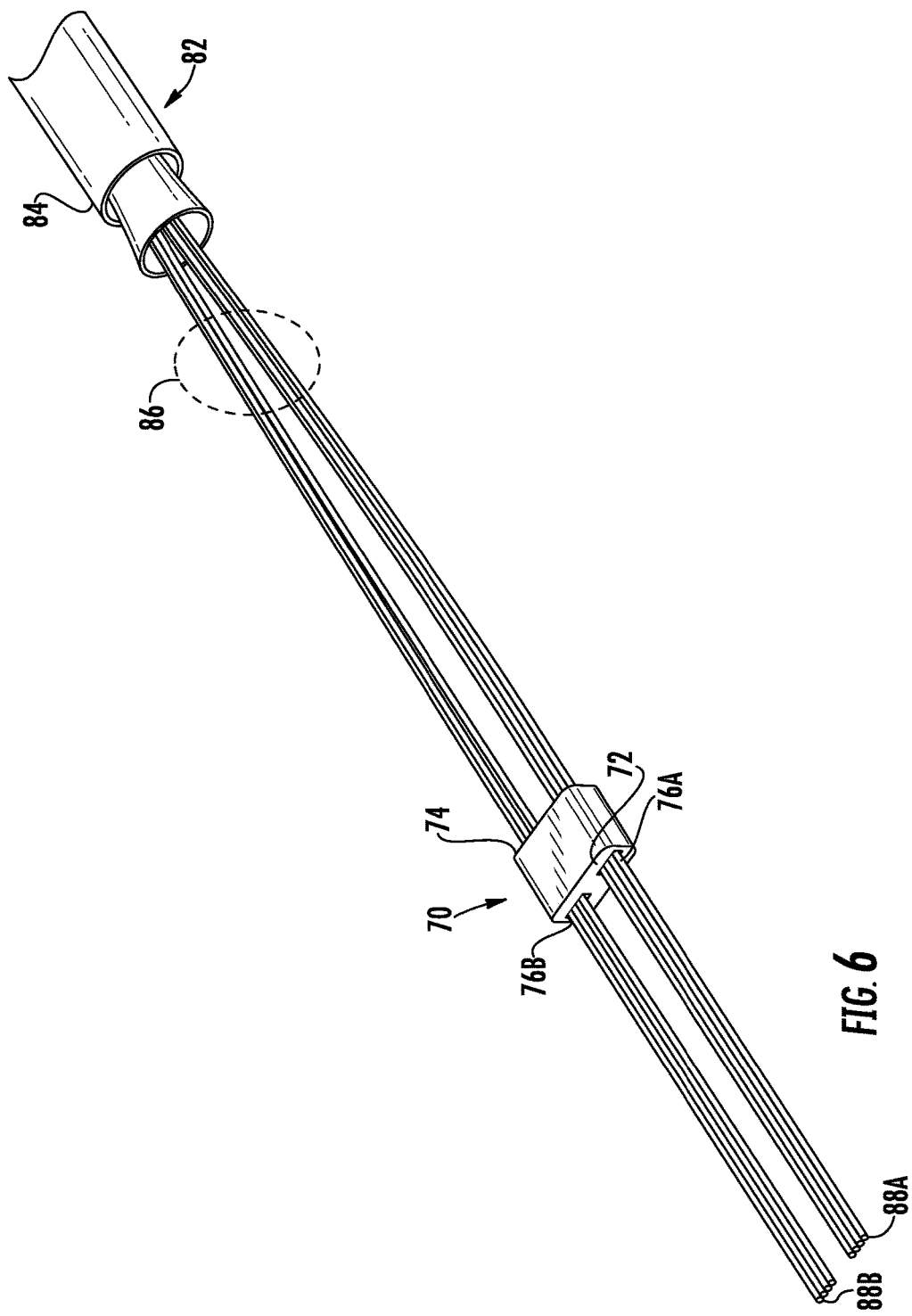
FIG. 6 is a perspective view of the fiber optic cable subassembly of FIG. 5 following insertion of a second group of loose optical fibers through a second aperture of the rear ferrule boot of FIGS. 4 and 5.
Figure 7:
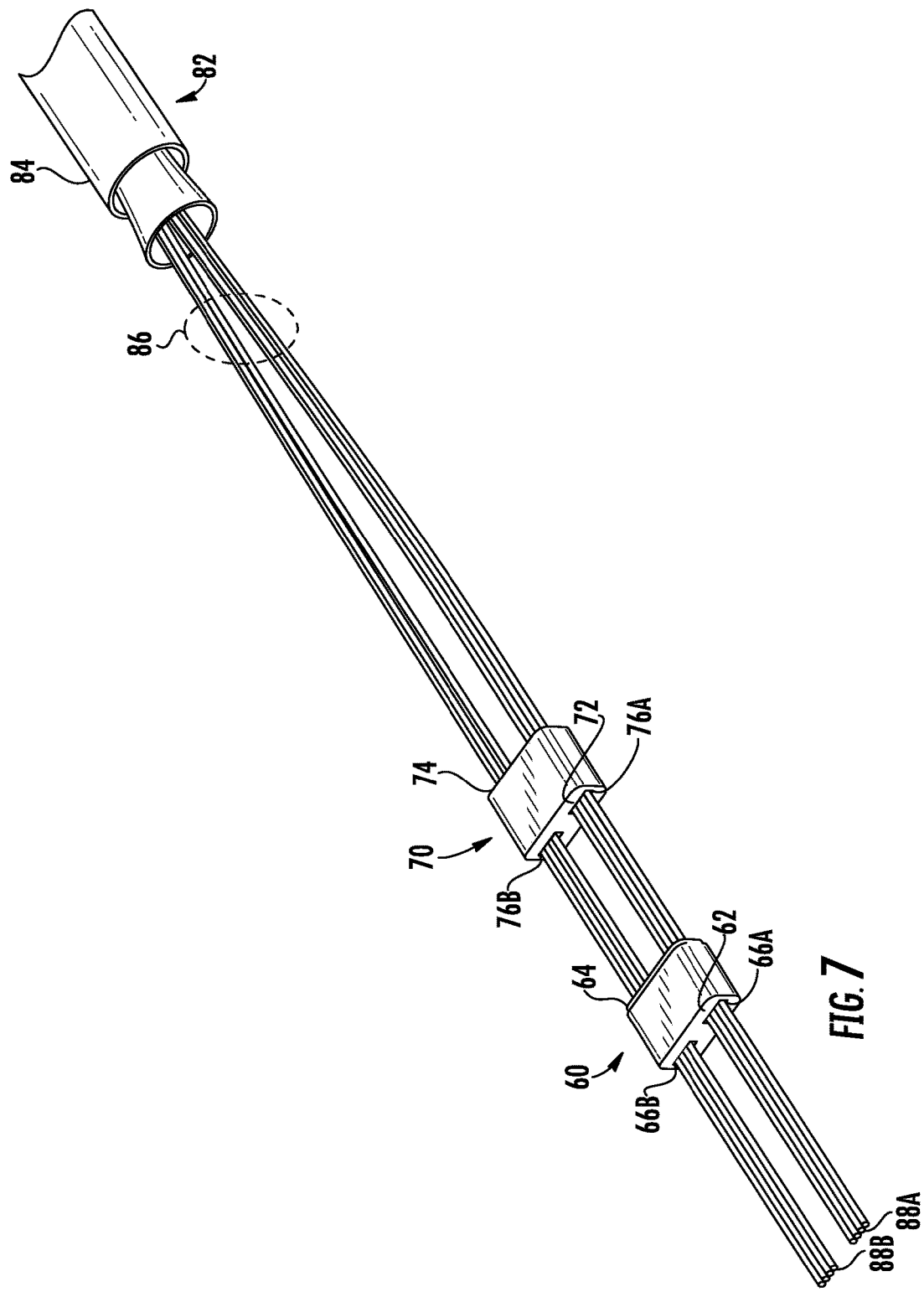
FIG. 7 is a perspective view of the fiber optic cable subassembly of FIGS. 5 and 6 following insertion of the first and second groups of loose optical fibers through first and second apertures, respectively, of the front ferrule boot of FIG. 4.

FIG. 5 illustrates a fiber optic cable 82 following removal of a portion of a jacket 84 to expose multiple optical fiber segments 86 that are loose in character (i.e., not ribbonized or otherwise adhered together). As shown, the loose optical fiber segments 86 emanating from the fiber optic cable 82 are collected or assembled (i.e., in correct order according to a desired orientation) into a first group of loose optical fibers 88A and a second group of loose optical fibers 88B. The first group of loose optical fibers 88A is inserted through the first aperture 76A of the rear ferrule boot 70 in a direction from the rear end face 74 toward the front end face 72 of the rear ferrule boot 70. Thereafter, the second group of loose optical fibers 88B is inserted through the second aperture 76B of the rear ferrule boot 70 in the same direction, as shown in FIG. 6. Similar optical fiber insertion steps are then performed with the front ferrule boot 60. Specifically, the first group of loose optical fibers 88A is inserted through the first aperture 66A of the front ferrule boot 60, and the second group of loose optical fibers 88B is inserted through the second aperture 66B of the front ferrule boot 60, with both insertion steps being made in a direction from the rear end face 64 toward the front end face 62 of the front ferrule boot 60. The resulting state in which the first and second groups of loose optical fibers 88A, 88B are each restrained by both the rear ferrule boot 70 and the front ferrule boot 60, and the front ferrule boot 60 is spaced apart from the rear ferrule boot 70 in a longitudinal direction, is shown in FIG. 7.

Optical fibers are typically produced with a polymeric coating to protect the light-carrying ability of the glass core and to preserve the strength of the resulting fiber. It is typically necessary to remove (e.g., "strip") such a coating to enable an optical fiber to be terminated.

Figure 8:
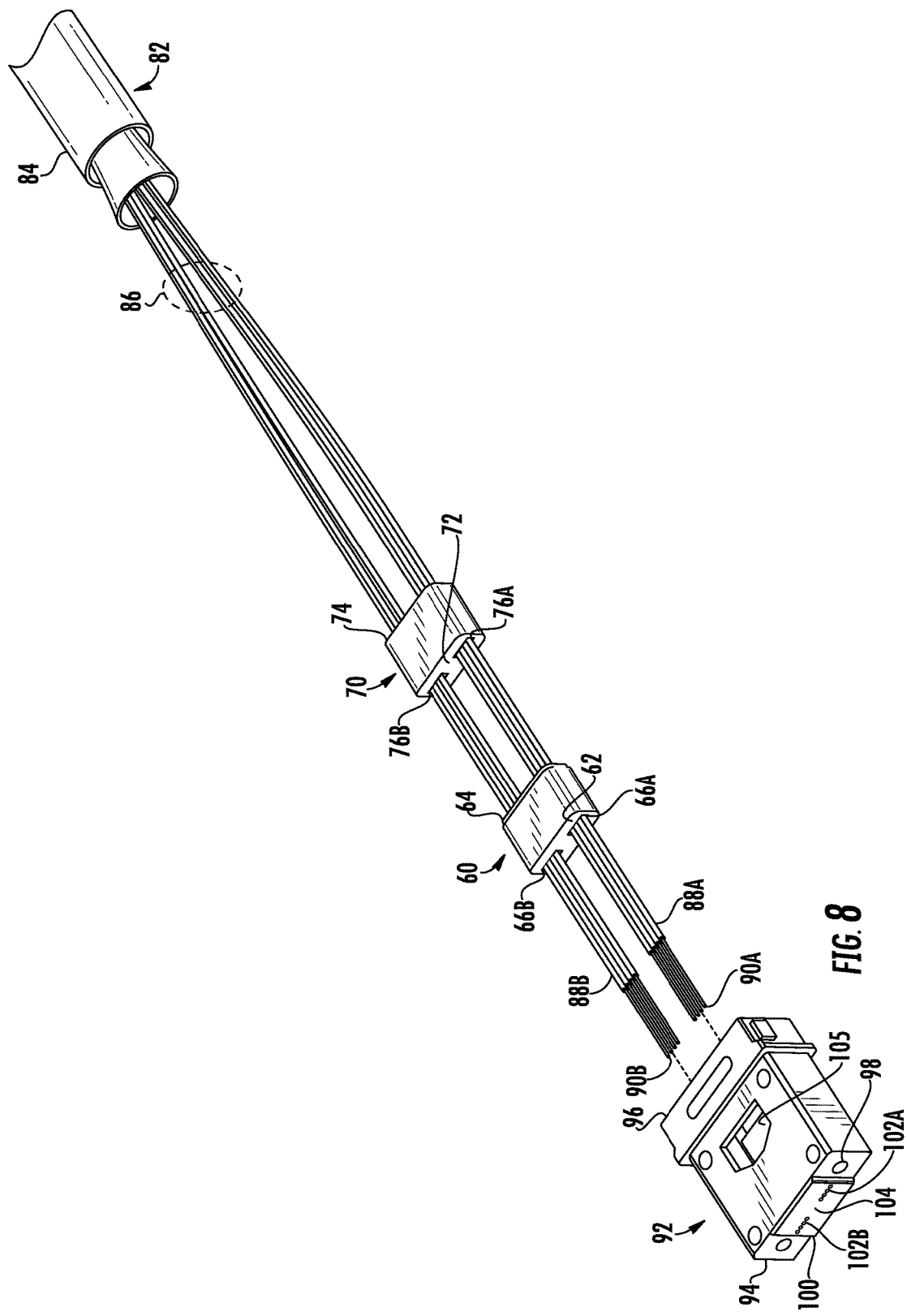
FIG. 8 is a partially exploded perspective view of the fiber optic cable subassembly of FIG. 7 following stripping of a protective coating from each optical fiber of the first and second groups of loose optical fibers, showing a ferrule separated from the optical fibers, with first and second groups of bores of the ferrule being registered with the first and second groups of loose optical fibers.

FIG. 8 illustrates the cable 82 and first and second groups of loose optical fibers 88A, 88B restrained by front and rear ferrule boots 60, 70, following the stripping of a coating associated with the first and second groups of loose optical fibers 88A, 88B to yield first and second groups of exposed fiber cores 90A, 90B that are positioned proximate to a ferrule 92. The ferrule 92 includes a front end face 94 and a rear end face 96 generally opposing the front end face 94. A recess (not shown) defined in the rear end face 96 is configured to receive at least a portion of the front ferrule boot 60, wherein an interior of the ferrule 92 defines a passage permitting the first and second groups of bare fiber sections 90A, 90B to be inserted therethrough. Peripheral portions of the front end face 94 define pin holes 98 arranged to receive guide pins (shown in FIG. 10), while a central portion of the front end face 94 projects forward to form a pedestal portion 100 of the front end face 94 that defines first and second groups of bores 102A, 102B, wherein such groups of bores 102A, 102B are separated by a medial end portion 104 of the front end face 94. The first and second groups of bores 102A, 102B are preferably sized and spaced to receive the first and second groups of bare fiber sections 90A, 90B. A window 105 defined in an upper surface of the ferrule 92 permits the first and second groups of bare fiber sections 90A, 90B to be viewed during insertion thereof through the interior of the ferrule 92. In certain embodiments, excess lengths of the first and second groups of bare fiber sections 90A, 90B may be inserted through the groups of bores 102A, 102B to permit individual fiber cores to be cleaved and/or terminated proximate to the front end face 94 (e.g., along the pedestal portion 100) of the ferrule 92. Each group of loose optical fibers 88A, 88B and/or group of bare fiber sections 90A, 90B may be secured to the ferrule 92 (e.g., proximate to the groups of bores 102A, 102B) by a suitable adhesive material (e.g., an epoxy).

Figure 9:
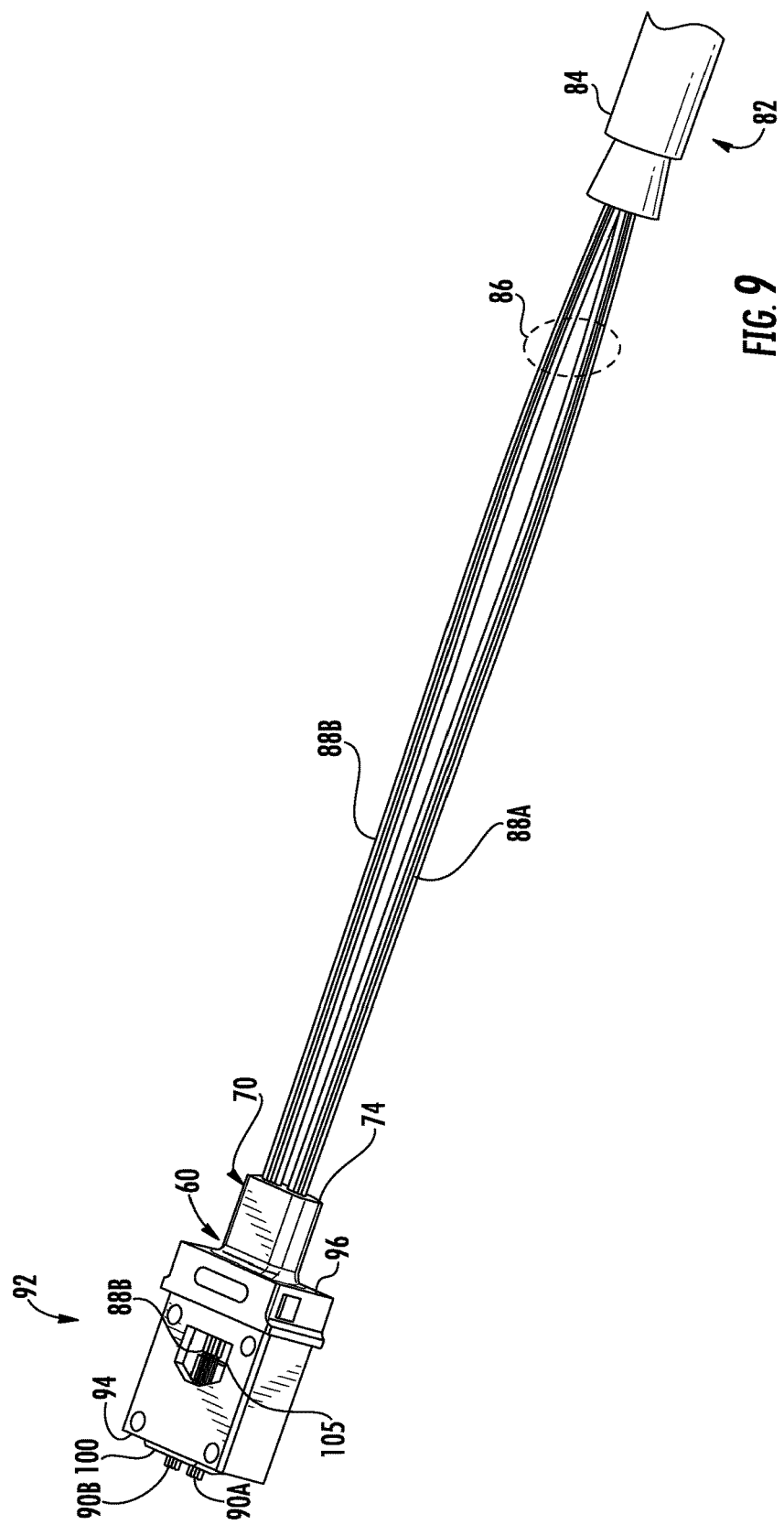
FIG. 9 is a perspective view of the fiber optic cable subassembly of FIG. 8 following insertion of the stripped ends of the first and second groups of loose optical fibers through the first and second groups of bores defined by the ferrule.

FIG. 9 shows the components of FIG. 8 following insertion of the first and second groups of bare fiber sections 90A, 90B through the first and second groups of bores 102A, 102B, and following movement of the front and rear ferrule boots 60, 70 toward the ferrule 92. In particular, at least a portion of the front ferrule boot 60 is received within a recess (not shown) defined in the rear end face 96 of the ferrule 92, and the rear ferrule boot 70 is arranged proximate to (optionally, in contact with) the front ferrule boot 60. As illustrated, a transition between the groups of bare fiber sections 90A, 90B and the (coated) first and second groups of loose optical fibers 88A, 88B is visible through the window 105 defined in the ferrule 92, and excess lengths of the first and second groups of bare fiber sections 90A, 90B protrude forward beyond the pedestal portion 100 of the front end face 94 of the ferrule 92. Such excess lengths are preferably reduced by terminating the first and second groups of bare fiber sections 90A, 90B proximate to (e.g., substantially flush) with at least a portion of the front end face 94.

Figure 10:
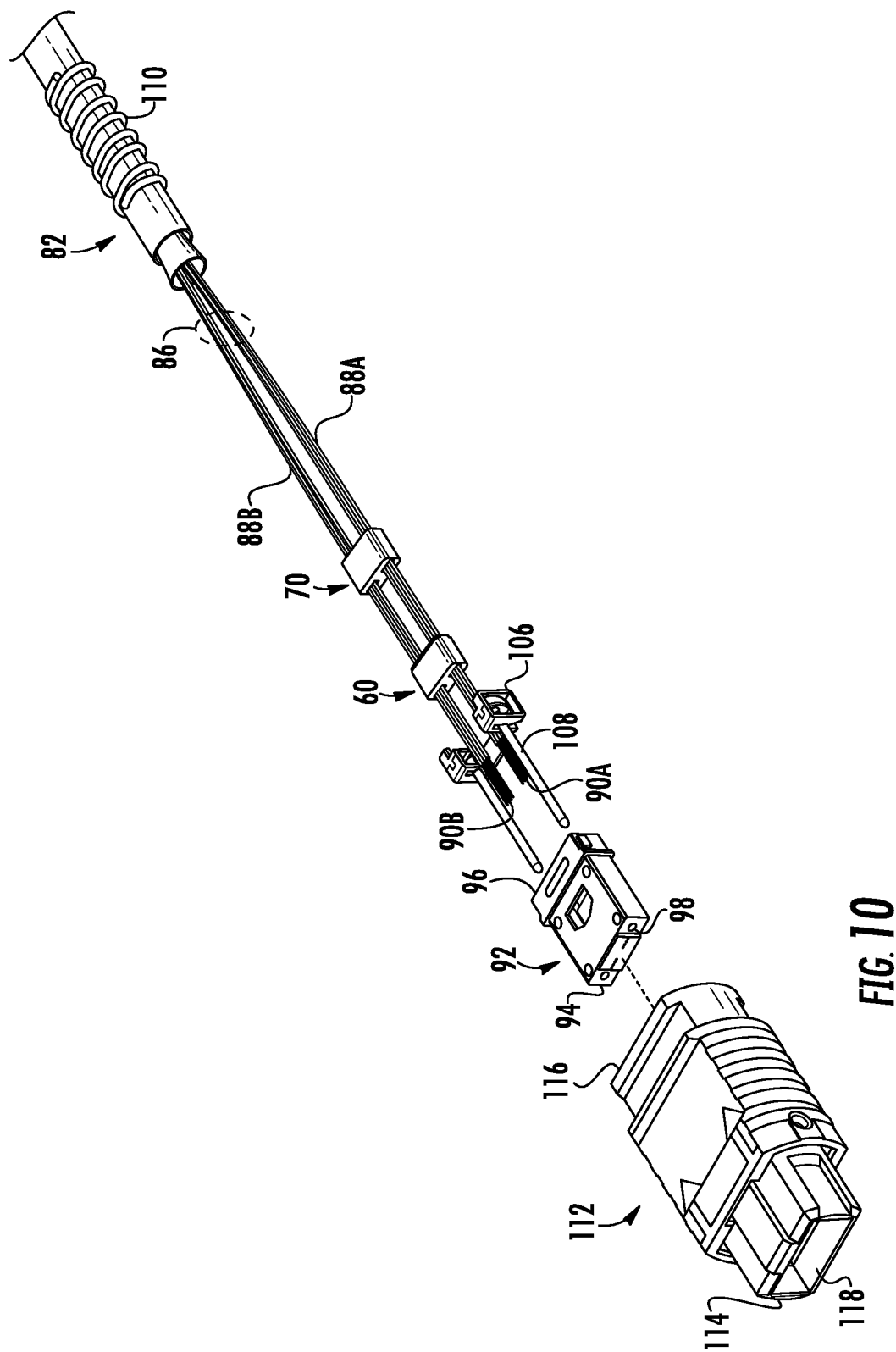
FIG. 10 is an exploded perspective view of the fiber optic cable subassembly of FIG. 8, with addition of a pin keeper, guide pins, and a housing configured to cooperate with the ferrule.

FIG. 10 is an exploded perspective view of the components illustrated in FIG. 8, with addition of a pin keeper 106, guide pins 108, and a housing 112 configured to cooperate with the ferrule 92. The first and second groups of loose optical fibers 88A, 88B emanating from the cable 82 are secured by front and rear ferrule boots 60, 70. A coating associated with the first and second groups of loose optical fibers 88A, 88B has been stripped to yield first and second groups of bare fiber sections 90A, 90B. The first and second groups of bare fiber sections 90A, 90B are positioned for insertion into the first and second groups of bores 102A, 102B defined in the front end face 94 of the ferrule 92. The pin keeper 106 and corresponding forwardly extending guide pins 108 are configured to cooperate with the ferrule 92. The housing 112 includes a front end 114 and a rear end 116, and defines an internal passage 118 is configured to receive the ferrule 92. When assembled, the pin keeper 106 is configured to be positioned against the rear end face 96 of the ferrule 92, and the guide pins 108 extend through pin holes 98 defined in the ferrule 92 so as to project forward beyond the front end face 94 of the ferrule 92. When assembled, the ferrule 92, the pin keeper 106, and the guide pin 108 in combination are configured to be biased to a forward position by a spring 110 (illustrated in a pre-assembly position in FIG. 10), so that a front portion of the ferrule 92 extends beyond the front end 114 of the housing 112.

Figure 11:
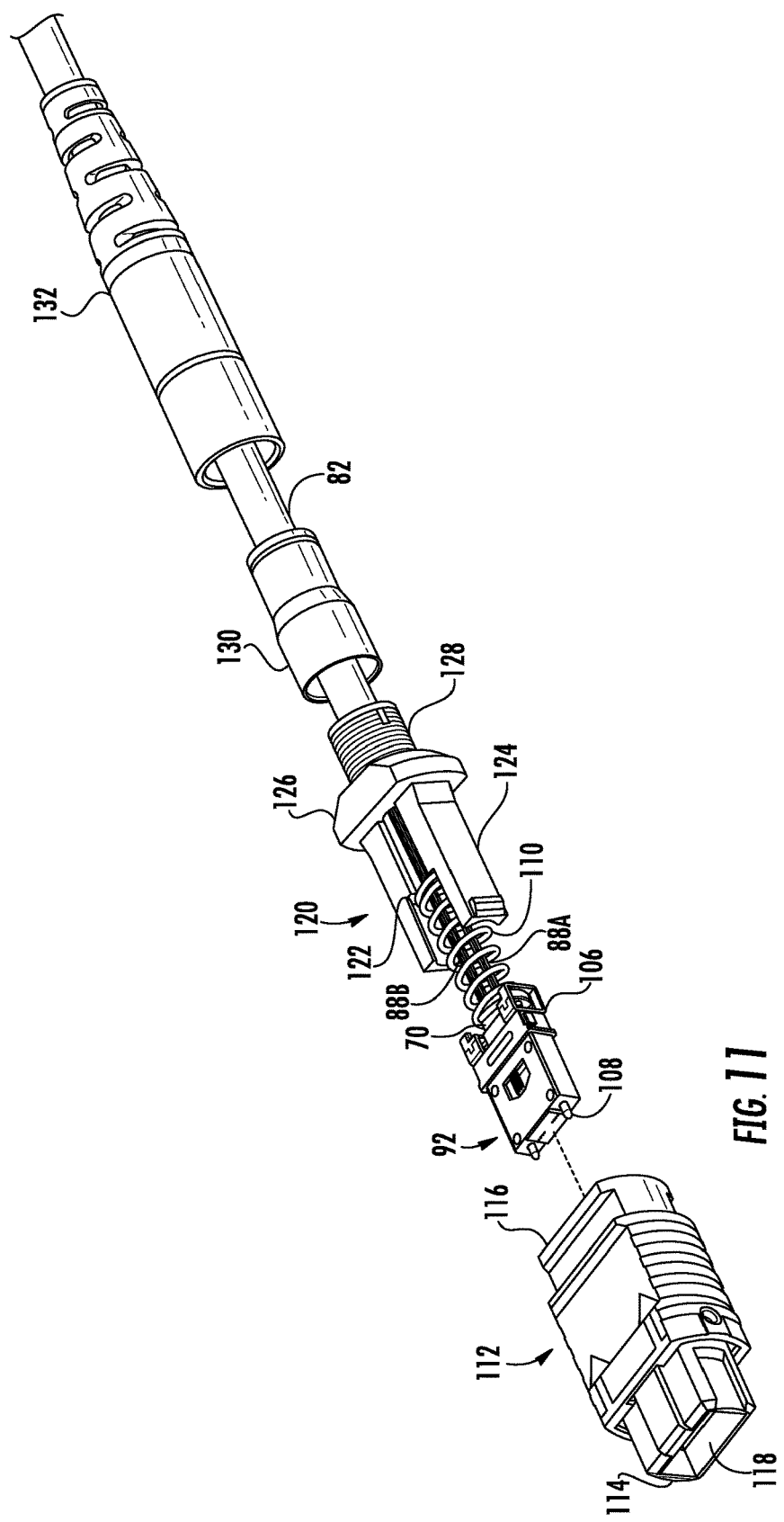
FIG. 11 is a partially exploded perspective view of the fiber optic cable subassembly of FIG. 10, with addition of a crimp body and following insertion of the first and second groups of loose optical fibers through the first and second groups of bores defined by the ferrule, and termination of the optical fibers proximate to a front end face of the ferrule.

FIG. 11 depicts the components illustrated in FIG. 8, with addition of a crimp body 120 and a crimp ring 130 as well as a boot 132 received over the cable 82. The spring 110 is positioned between the ferrule 92 and medial shoulders 122 formed by latching arms 124 of the crimp body 120. In certain embodiments, the spring 110 and at least the rear ferrule boot 70 may be sized to permit the rear ferrule boot 70 to fit within an interior of the spring 110. At least a substantial portion of the front ferrule boot (not shown) is already received within a recess defined in a rear end face 96 of the ferrule 92. Upon assembly, the crimp body 120 is inserted into the housing 112, and the latching arms 124 engage recesses (not shown) in the housing 112. A flared portion 126 of the crimp body is positioned between the latching arms 124 and an end portion 128 of the crimp body 120 that projects rearwardly from the flared portion 126 to receive a front portion of the crimp ring 130.

Figure 12:
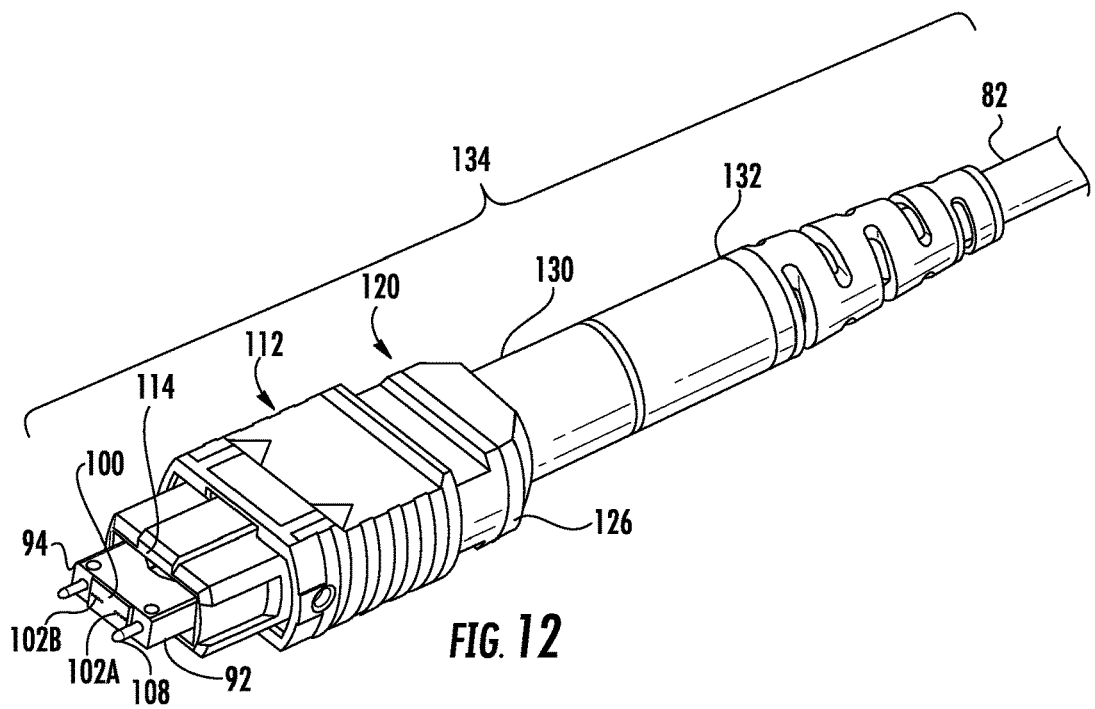
FIG. 12 is a perspective view of a fiber optic cable assembly including the elements shown in FIG. 11.

FIG. 12 is a perspective view of a fiber optic cable assembly 134 including the elements shown in FIG. 11 following assembly thereof. As shown, the ferrule 92 and the crimp body 120 are received by the housing 112, with the ferrule 92 and guide pins 108 biased to a forward position. In particular, the ferrule 92 projects forward beyond a front end 114 of the housing 112, and the guide pins 108 project forward beyond the front end face 94 of the ferrule. The pedestal portion 100 of the front end face 94 arranged between the guide pins 108 defines ends of the first and second groups of bores 102A, 102B that contain terminated optical fibers. Turning rearward, the flared portion 126 of the crimp body 120 is arranged proximate to a front end of the crimp ring 130, and the boot 132 is further arranged over a rear end of the crimp ring 130. The fiber optic cable 82 extends rearwardly from a rear end of the boot 132.

In certain embodiments, a manufacturing fixture utilizing an internal jig may be used to retain a fiber optic cable subassembly including front and rear ferrule boots as disclosed herein to facilitate processing of optical fibers and assembly of connector elements. Use of such a manufacturing fixture advantageously secures elements of a fiber optic cable subassembly in desired positions, such as by compressive contact, to enable precise relative positioning and/or processing of elements. For example, a medial section of at least one group of optical fibers and a rear ferrule boot may be retained within a manufacturing fixture, and a front ferrule boot as well as a terminal section of the at least one group of optical fibers may be positioned outside the manufacturing fixture to permit performance of steps such as: inserting the at least one group of optical fibers through at least one group of bores defined in a ferrule; receiving at least a portion of the front ferrule boot within a rear portion of the ferrule; stripping end portions of the at least one group of optical fibers; cleaving the at least one group of optical fibers; or terminating the at least one group of optical fibers (e.g., proximate to a front end face of the ferrule). Securement of at least one group of optical fibers at first and second locations using a rear ferrule boot and a front ferrule boot that are sequentially arranged simplifies loading of the optical fibers into a manufacturing fixture while preventing twisting and misalignment of the optical fibers.

Figure 13A:
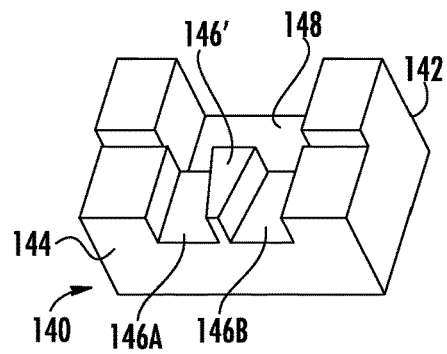
FIGS. 13A-13C provide upper perspective views of first, second, and third alternative jigs, respectively, for use with a manufacturing fixture that is configured to receive a fiber optic cable subassembly including front and rear ferrule boots as disclosed herein.
Figure 13B:
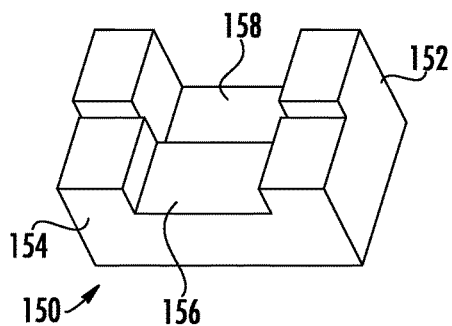
Figure 13C:
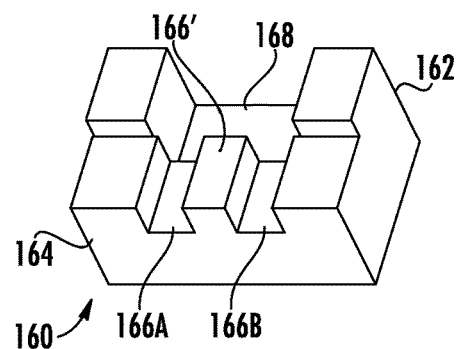

FIGS. 13A-13C provide upper perspective views of first, second, and third alternative jigs 140, 150, 160 suitable for use with a manufacturing fixture (such as the fixture 170 shown in FIG. 14 and described further below) for retaining elements of a fiber optic cable subassembly including at least one group of optical fibers restrained by front and rear ferrule boots as disclosed herein. Each jig 140, 150, 160 comprises a rectangular shape when viewed from above, and may be fabricated of a substantially rigid material (e.g., polymeric, metal, or ceramic material) by a suitable technique such as molding, casting, machining, sintering, etc. As shown in FIG. 13A, the first jig 140 includes a front end 142, a rear end 144, a ferrule boot receiving area 148 proximate to the front end 148, and two recesses 146A, 146B separated by a lateral divider 146'. Each recess 146A, 146B is configured to receive a different group of optical fibers. The lateral divider 146' comprises an elongated triangular shape with an apex proximate to the rear end 144 when viewed from above, so that each recess 146A, 146B tapers in width with increasing direction from the rear end 144 toward the front end 142. As shown, the ferrule boot receiving area 148 is slightly wider than a combined width of the lateral divider 146' and the recesses 146A, 146B. Additionally, the lateral divider 146 is recessed downward relative to the recesses 146A, 146B, preferably at a depth that is about half the height of a rear ferrule boot received by the ferrule boot receiving area 148.

FIG. 13B illustrates a second jig 150 that includes a front end 152, a rear end 154, a ferrule boot receiving area 158 proximate to the front end 152, and a recess 156 (configured to receive a group of optical fibers) proximate to the rear end 154. The ferrule boot receiving area 158 is recessed downward relative to the recess 156, preferably at a depth that is about half the height of a rear ferrule boot received by the ferrule boot receiving area 158. As shown, the ferrule boot receiving area 158 is also slightly wider than the recess 156.

FIG. 13C illustrates a third jig 160 that includes a front end 162, a rear end 164, a ferrule boot receiving area 168 proximate to the front end 162, and two recesses 166A, 166B separated by a lateral divider 166'. Each recess 166A, 166B is configured to receive a different group of optical fibers. As shown in FIG. 13C, the lateral divider 166' as well as each recess 166A, 166B comprise a rectangular shape, such that each recess 166A, 166B comprises a substantially constant width. The ferrule boot receiving area 168 is recessed downward relative to the recesses 166A, 166B, preferably at a depth that is about half the height of a rear ferrule boot received by the ferrule boot receiving area 168. Additionally, the ferrule boot receiving area 168 is slightly wider than a combined width of the lateral divider 166' and the recesses 166A, 166B.

Figure 14A:
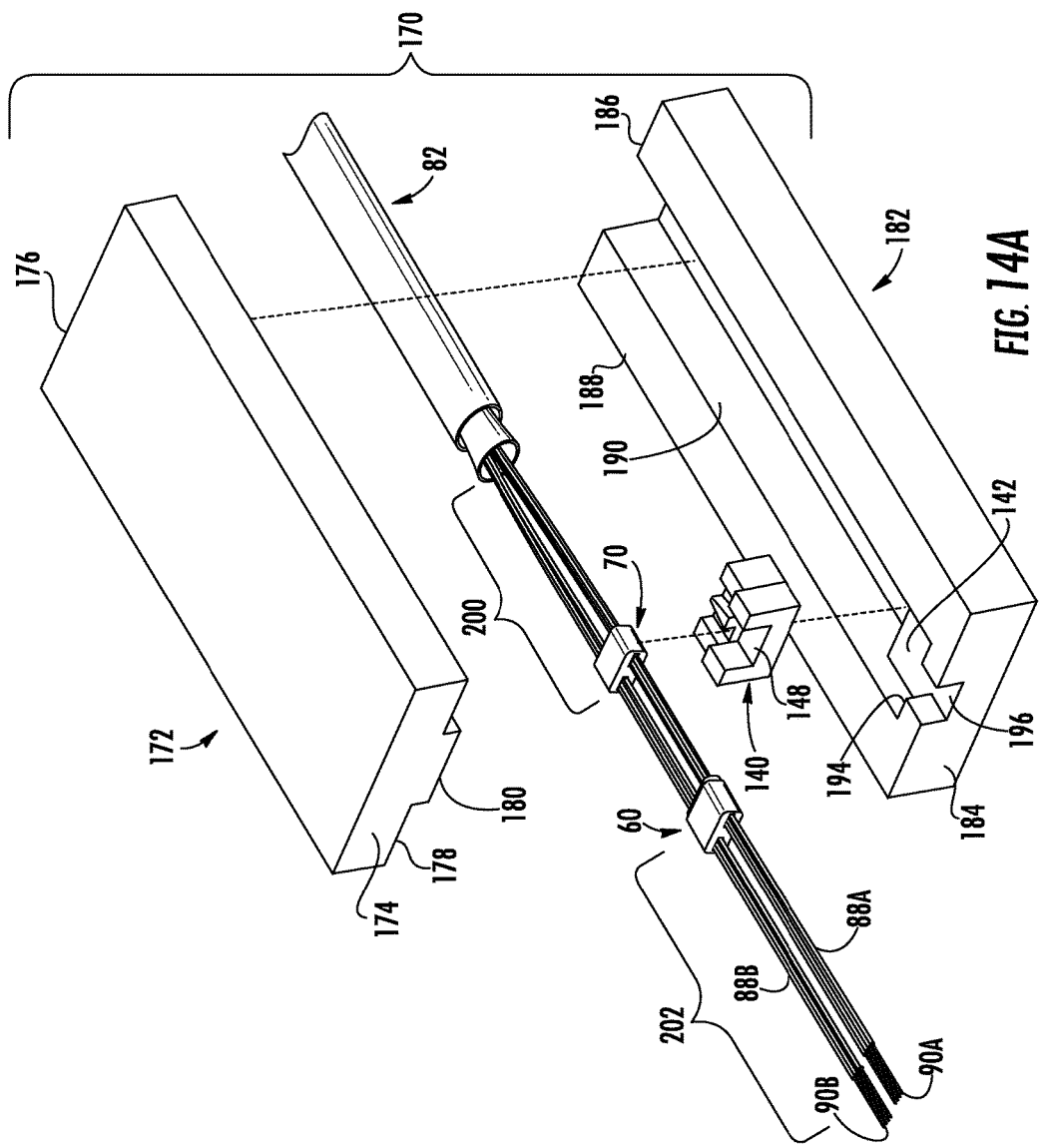
FIG. 14A is an exploded perspective view of a manufacturing fixture incorporating the jig of FIG. 13A and arranged to receive a fiber optic subassembly according to FIG. 8.

FIG. 14A is an exploded perspective view of a manufacturing fixture 170 incorporating the jig 140 of FIG. 13A and arranged to receive a fiber optic subassembly including elements shown in FIG. 8. The manufacturing fixture 170 includes a cover portion 172 and a base portion 182 that are both generally rectangular when viewed from above. The cover portion 172 includes a front end 174, a rear end 176 opposing the front end 174, and a lower face 178 that includes a medial protrusion 180 extending between the front end 174 and the rear end 176. The medial protrusion 180 is generally rectangular in shape and extends downward from peripheral portions of the lower face 178. The base portion 182 includes a front end 184, a rear end 186 opposing the front end 184, an upper surface 188, a main channel 190, a ledge portion 192, and medial shoulders 192 proximate to the ledge portion 192 that laterally bound an outlet channel 196 having a reduced width relative to the main channel 190. The main channel 190 extends in a longitudinal direction from the rear end 186, and extends to the ledge portion 192 and the medial shoulders 192. The main channel 190 is sized and shaped to receive a length of a fiber optic cable 82, and is configured to receive the jig 140 proximate to the ledge portion 192. The jig 140 may be configured to be removably received by the manufacturing fixture 170. The medial shoulders 194 and the outlet channel 196 are arranged proximate to the front end 184, with the ledge portion 192 defining a lower boundary of the outlet channel 196. The front end 174 of the cover portion 172 is configured to be aligned with a rearward edge of the medial shoulders 194, such that a top portion of the outlet channel 196 is uncovered when the cover portion 172 is mated with the base portion 182. The medial protrusion 180 is also configured to be received within an upper portion of the main channel 190, preferably in compressive contact with the rear ferrule boot 70. The lower face 178 of the cover 172 is configured to contact the upper surface 188 of the base portion 182 upon assembly of the manufacturing fixture 170.

Figure 14B:
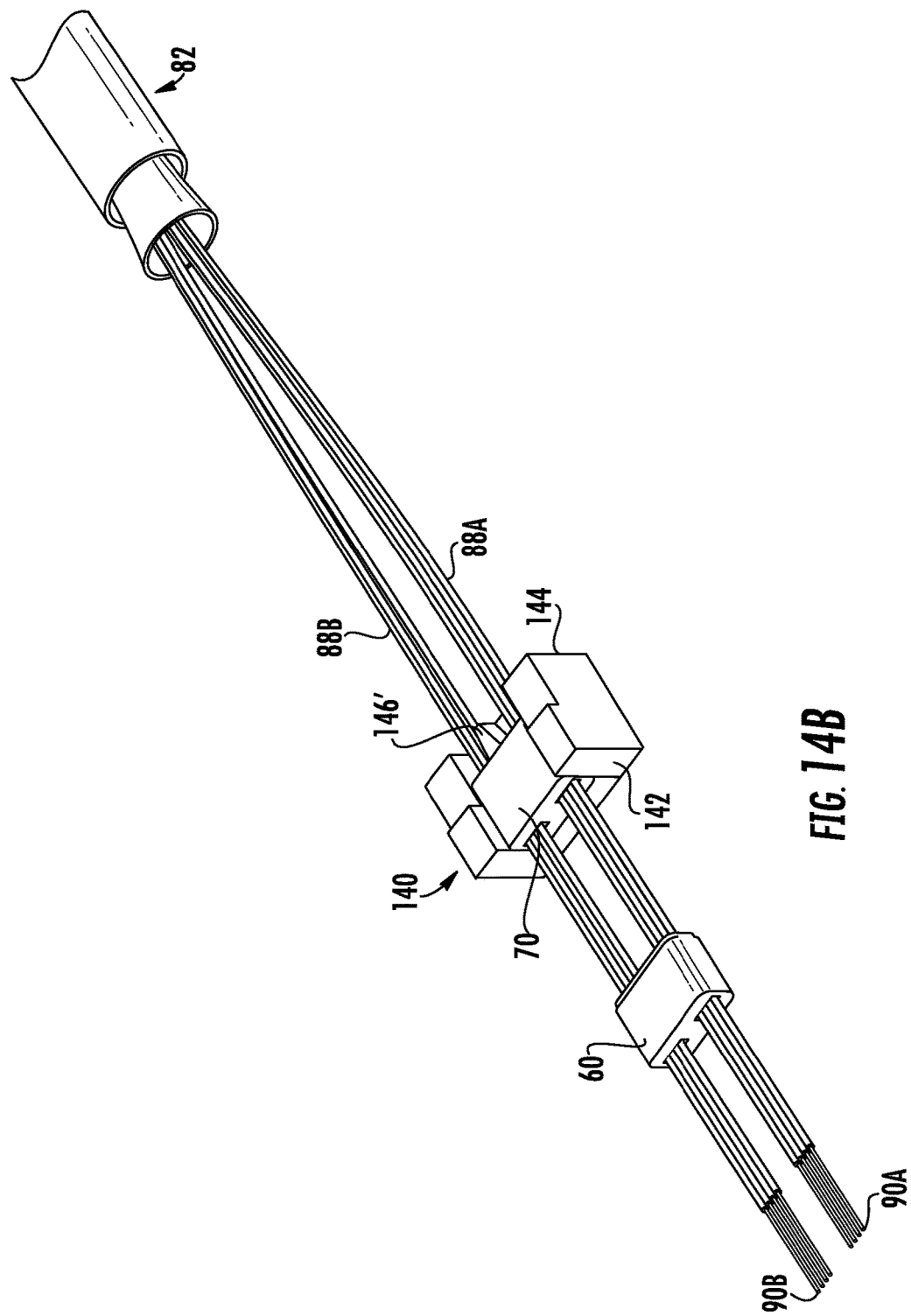
FIG. 14B is a perspective view of the fiber optic subassembly of FIG. 8 with a rear ferrule boot received in the jig of FIGS. 14A and 13A.

Prior to use of the manufacturing fixture 170, first and second groups of loose optical fibers 88A, 88B emanating from the fiber optic cable 82 are restrained by front and rear ferrule boots 60, 70. A medial section 200 of each group of loose optical fibers 88A, 88B is arranged closer to the fiber optic cable 82, and a terminal section 202 of each group of loose optical fibers 88A, 88B is arranged closer to terminal ends thereof (which may be stripped of any protective coating(s) to yield first and second groups of bare fiber sections 90A, 90B, either prior to or after the first and second groups of loose optical fibers 88A, 88B and the front and rear ferrule boots 60, 70 are received by the manufacturing fixture 170). Medial sections 200 of each group of loose optical fibers 88A, 88B are retained by channels of the jig 140 on either side of the lateral divider 146', and the rear ferrule boot 70 is arranged within the ferrule boot receiving area 148. As shown in FIG. 14B, in certain embodiments, the first and second groups of loose optical fibers 88A, 88B and the rear ferrule boot 140 may be preinstalled into the jig 140, prior to placement of these components into the base portion 182 of the manufacturing fixture 170 of FIG. 14A.

FIG. 14C shows the manufacturing fixture 170 of FIG. 14A in an assembled state, with sections of the first and second groups of loose optical fibers 88A, 88B emanating from the fiber optic cable 82, in addition to the jig 140 and rear ferule boot 70 (both shown in FIGS. 14A and 14B) retained within the manufacturing fixture 170. A portion of the upper surface 188 of the base portion 182 is exposed forward of the front end 174 of the cover portion 172. As shown, the first and second groups of loose optical fibers 88A, 88B extend through the outlet channel 196, such that terminal sections of the first and second groups of loose optical fibers 88A, 88B as well as the front ferrule boot 60 are positioned outside the manufacturing fixture 170. Such a state renders the front ferrule boot 60 available to be inserted into a ferrule, and permits ends of the first and second groups of loose optical fibers 88A, 88B (optionally stripped to form the first and second groups of bare fiber sections 90A, 90B) to be processed.

Figure 14D:
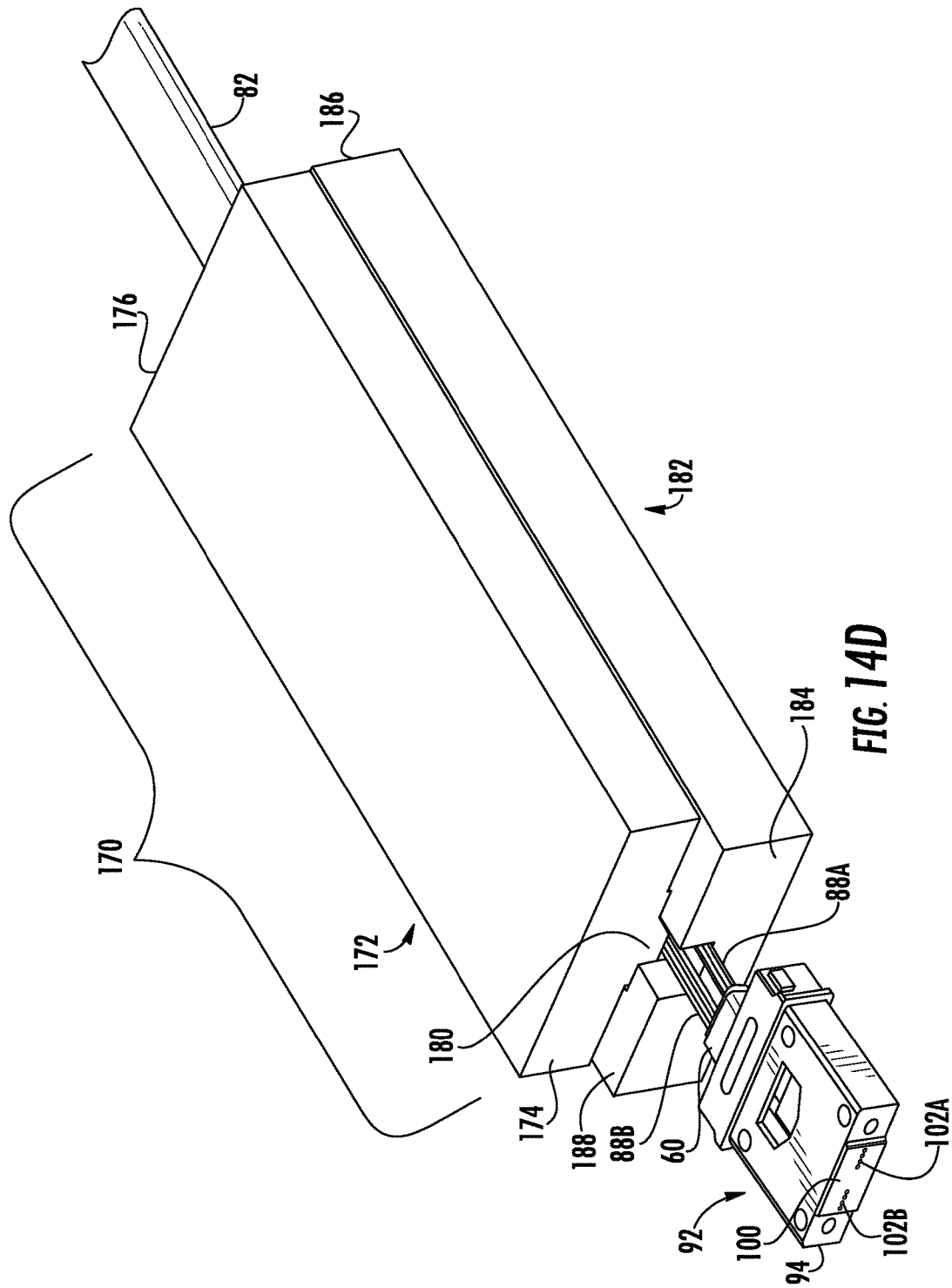
FIG. 14D is a perspective view of the manufacturing fixture of FIG. 14C following insertion of the first and second groups of loose optical fibers through the first and second groups of bores defined by the ferrule, and termination of the optical fibers proximate to the front end face of the ferrule.

FIG. 14D shows the assembled manufacturing fixture 170 of FIG. 14C following insertion of the front ferrule boot 60 into a rear portion of the ferrule 92, and following termination of first and second groups of bare fiber sections (not shown) retained by first and second groups of bores 102A, 102B in the pedestal portion 100 of the front end face 94 of the ferrule 92. Securing the cable 82, first and second groups of loose optical fibers 88A, 88B, and the rear ferrule boot 70 using the manufacturing fixture 170 enables precise relative positioning and/or processing of elements, such as threading of optical fibers or bare fiber sections through the bores 102A, 102B, stripping of coatings from optical fibers, cleaving of optical fibers, and/or termination (e.g., including polishing and any other desired end treatment) of optical fibers.

Consistent with the foregoing, a method for fabricating a fiber optic cable assembly may include multiple steps. An initial step may include assembling a plurality of loose optical fiber segments emanating from a fiber optic cable into at least one group of loose optical fibers. The loose optical fibers are non-ribbonized. Subsequently, the at least one group of loose optical fibers is inserted through at least one aperture defined in a rear ferrule boot, and the at least one group of loose optical fibers is inserted through at least one aperture defined in a front ferrule boot. Thereafter, at least a portion of the front ferrule boot is received within a rear portion of a ferrule. Terminal ends of the at least one group of loose optical fibers may be inserted through at least one group of microholes or bores defined in a front end face of the ferrule. Terminal ends of the at least one group of loose optical fibers may be pre-stripped before receipt, or may be stripped after the foregoing steps. Preferably, the at least one group of loose optical fibers is adhesively secured to the ferrule proximate to the at least one group of bores. Following reception of optical fibers and the front ferrule boot by the ferrule, a housing may be received over at least a portion of the ferrule, and the ferrule may be spring biased within the housing so that a front portion of the ferrule extends beyond a front end of the housing.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A fiber optic cable assembly comprising:
   a fiber optic cable;
   a ferrule comprising a front end face and defining at least one group of bores extending through the front end face;
   at least one group of optical fibers emanating from the fiber optic cable and extending through the at least one group of bores, wherein ends of optical fibers of the at least one group of optical fibers are terminated proximate to the front end face, and the optical fibers of the at least one group of optical fibers are restrained within the ferrule proximate to the at least one group of bores;
   a front ferrule boot defining at least one aperture through which the at least one group of optical fibers extends; and
   a rear ferrule boot defining at least one aperture through which the at least one group of optical fibers extends;
   wherein at least a forward portion of the front ferrule boot is received within a rear portion of the ferrule;
   wherein the front ferrule boot is positioned between a portion of the ferrule and the rear ferrule boot; wherein the at least one group of optical fibers is non-ribbonized when extending through the at least one aperture in the front ferrule boot and through the at least one aperture in the rear ferrule boot. and
   wherein:
      the at least one group of optical fibers comprises a first group of optical fibers and a second group of optical fibers;
      the at least one aperture defined by the front ferrule boot comprises a first aperture through which the first group of optical fibers extends and a second aperture through which the second group of optical fibers extends; and
      the at least one aperture defined by the rear ferrule boot comprises a first aperture through which the first group of optical fibers extends and a second aperture through which the second group of optical fibers extends.

2. The fiber optic cable assembly of claim 1, wherein:
   the first aperture of the front ferrule boot is laterally offset relative to the second aperture of the front ferrule boot; and
   the first aperture of the rear ferrule boot is laterally offset relative to the second aperture of the rear ferrule boot.

3. The fiber optic cable assembly of claim 1, wherein:
   the first aperture of the front ferrule boot is vertically offset relative to the second aperture of the front ferrule boot; and
   the first aperture of the rear ferrule boot is vertically offset relative to the second aperture of the rear ferrule boot.

4. The fiber optic cable assembly of claim 1, wherein the front ferrule boot comprises at least one of a height dimension or a width dimension that exceeds a corresponding height dimension or width dimension of the rear ferrule boot.

5. The fiber optic cable assembly of claim 1, further comprising a housing received over at least a portion of the ferrule, and at least one spring arranged to bias the ferrule within the housing so that a front portion of the ferrule extends beyond a front end of the housing.

6. The fiber optic cable assembly of claim 1, further comprising:
   a pin keeper positioned proximate to a rear surface of the ferrule; and
   guide pins extending forward from the pin keeper and through pin holes defined in the ferrule so as to project beyond the front end face.

7. The fiber optic cable assembly of claim 6, further comprising:
   a housing received over at least a portion of the ferrule;
   a crimp body that projects rearwardly from the housing; and
   at least one spring positioned between the pin keeper and the crimp body to exert a biasing force on the ferrule via the pin keeper.

8. The fiber optic cable assembly of claim 1, wherein:
   the at least one group of bores comprises at least three groups of bores;
   the at least one group of optical fibers comprises at least three groups of optical fibers;
   the at least one aperture defined in the rear ferrule boot comprises at least three apertures; and
   the at least one aperture defined in the front ferrule boot comprises at least three apertures.

9. The fiber optic cable assembly of claim 1, wherein the front ferrule boot is arranged in contact with the rear ferrule boot.

10. The fiber optic cable assembly of claim 1, wherein the at least one aperture defined in the front ferrule boot and the at least one aperture defined in the rear ferrule boot each comprise a substantially rectangular cross-sectional shape.

11. A fiber optic cable assembly comprising:
    a fiber optic cable;
    a ferrule comprising a front end face and defining at least one group of bores extending through the front end face;
    at least one group of optical fibers emanating from the fiber optic cable and extending through the at least one group of bores, wherein ends of optical fibers of the at least one group of optical fibers are terminated proximate to the front end face, and the optical fibers of the at least one group of optical fibers are restrained within the ferrule proximate to the at least one group of bores;
    a front ferrule boot defining at least one aperture through which the at least one group of optical fibers extends;
    a rear ferrule boot defining at least one aperture through which the at least one group of optical fibers extends;
    a pin keeper positioned proximate to a rear surface of the ferrule;
    guide pins extending forward from the pin keeper and through pin holes defined in the ferrule so as to project beyond the front end face;

a housing received over at least a portion of the ferrule;
a crimp body that projects rearwardly from the housing; and
at least one spring positioned between the pin keeper and the crimp body to exert a biasing force on the ferrule via the pin keeper;
wherein at least a forward portion of the front ferrule boot is received within a rear portion of the ferrule;
wherein the front ferrule boot is positioned between a portion of the ferrule and the rear ferrule boot; and
wherein the at least one group of optical fibers is non-ribbonized when extending through the at least one aperture in the front ferrule boot and through the at least one aperture in the rear ferrule boot.

12. A fiber optic cable assembly comprising:
a fiber optic cable;
a ferrule comprising a front end face and defining at least one group of bores extending through the front end face;
at least one group of optical fibers emanating from the fiber optic cable and extending through the at least one group of bores, wherein ends of optical fibers of the at least one group of optical fibers are terminated proximate to the front end face, and the optical fibers of the at least one group of optical fibers are restrained within the ferrule proximate to the at least one group of bores;
a front ferrule boot defining at least one aperture through which the at least one group of optical fibers extends; and
a rear ferrule boot defining at least one aperture through which the at least one group of optical fibers extends;
wherein at least a forward portion of the front ferrule boot is received within a rear portion of the ferrule;
wherein the front ferrule boot is positioned between a portion of the ferrule and the rear ferrule boot;
wherein the at least one group of optical fibers is non-ribbonized when extending through the at least one aperture in the front ferrule boot and through the at least one aperture in the rear ferrule boot; and
wherein:
  the at least one group of bores comprises at least three groups of bores;
  the at least one group of optical fibers comprises at least three groups of optical fibers;
  the at least one aperture defined in the rear ferrule boot comprises at least three apertures; and
  the at least one aperture defined in the front ferrule boot comprises at least three apertures.

* * * * *